United States Patent
Dhua

(10) Patent No.: US 9,940,745 B2
(45) Date of Patent: *Apr. 10, 2018

(54) IMAGE MANIPULATION FOR ELECTRONIC DISPLAY

(71) Applicant: A9.com, Inc., Palo Alto, CA (US)

(72) Inventor: Arnab Sanat Kumar Dhua, Mountain View, CA (US)

(73) Assignee: A9.COM, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/597,325

(22) Filed: May 17, 2017

(65) Prior Publication Data
US 2017/0249768 A1    Aug. 31, 2017

Related U.S. Application Data

(63) Continuation of application No. 14/632,983, filed on Feb. 26, 2015, now Pat. No. 9,684,987.

(51) Int. Cl.
| | | |
|---|---|---|
| G06T 17/00 | (2006.01) | |
| G06T 11/60 | (2006.01) | |
| G06T 11/00 | (2006.01) | |
| G06T 7/507 | (2017.01) | |
| G06T 3/40 | (2006.01) | |

(52) U.S. Cl.
CPC ........... *G06T 11/60* (2013.01); *G06T 3/403* (2013.01); *G06T 7/507* (2017.01); *G06T 11/001* (2013.01); *G06T 2207/10024* (2013.01); *G06T 2207/20132* (2013.01); *G06T 2210/22* (2013.01); *G06T 2210/36* (2013.01)

(58) Field of Classification Search
CPC ............... G06T 11/60; G06T 2207/20132
See application file for complete search history.

(56) References Cited

U.S. PATENT DOCUMENTS

| | | |
|---|---|---|
| 7,391,423 B1 | 6/2008 | Manzari et al. |
| 2002/0191861 A1 | 12/2002 | Cheatle |
| 2009/0263038 A1 | 10/2009 | Luo et al. |

(Continued)

OTHER PUBLICATIONS

Cushen et al. Mobile Visual Clothing Search, 2013 IEEE International Conference on Multimedia and Expo Workshops, Jul. 2013.*

(Continued)

*Primary Examiner* — Charles Tseng
(74) *Attorney, Agent, or Firm* — Hogan Lovells US LLP

(57) ABSTRACT

The density of images to display can be increased, and distractions reduced, through intelligent cropping or manipulation of at least some of the images. For objects such as dresses represented in the images, the density can be increased by cropping away regions of background outside the object region(s). Locating regions representing the face and legs of the wearer can enable cropping of the top and/or bottom of the image in order to cause the dress to occupy the majority of the area of the image, and can provide for a level of consistency of the sizes of the objects across the images, regardless of the sources of the images. Representative colors of the objects can also be selected to adjust the background color, in order to provide for easy distinction between the images while not providing contrasting or unappealing colors that take away from the aesthetics of the objects.

20 Claims, 10 Drawing Sheets

(56) References Cited

U.S. PATENT DOCUMENTS

2013/0016902 A1 1/2013 Suino
2013/0088154 A1 4/2013 Van Hoof et al.

OTHER PUBLICATIONS

Non-Final Rejection issued in corresponding U.S. Appl. No. 14/632,983, dated Sep. 26, 2016, 21 pages.
Notice of Allowance issued in corresponding U.S. Appl. No. 14/632,983, dated Feb. 27, 2017, 8 pages.

* cited by examiner

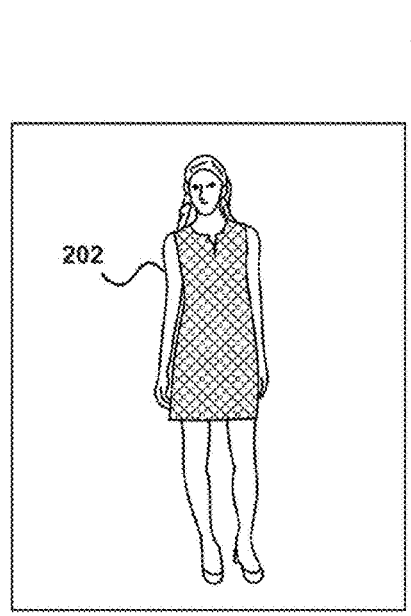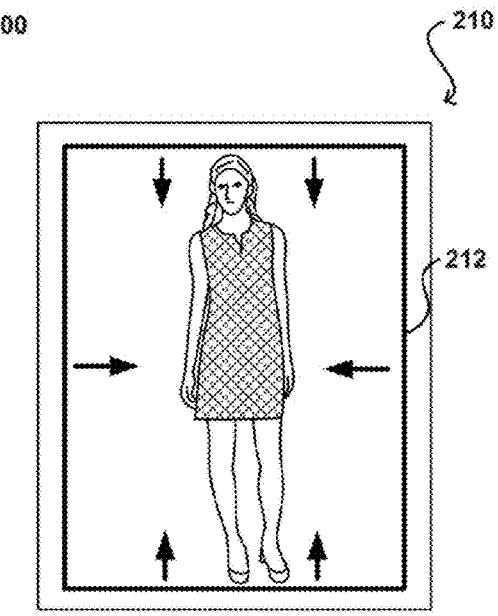
FIG. 2A  FIG. 2B
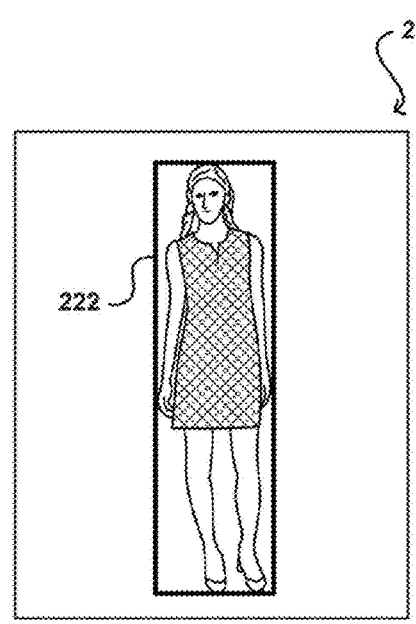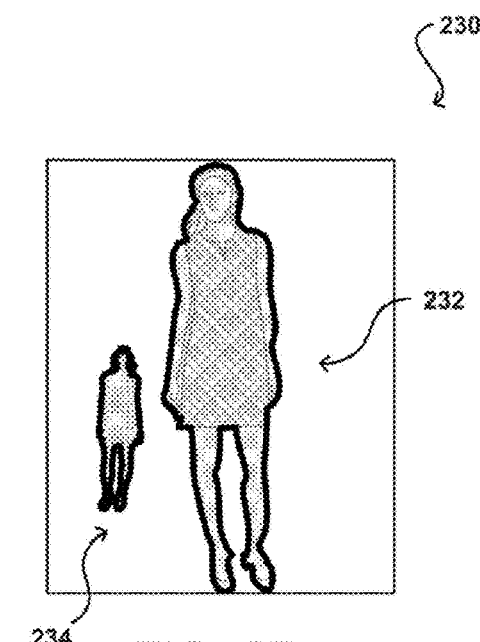
FIG. 2C  FIG. 2D

IMAGE MANIPULATION FOR ELECTRONIC DISPLAY

CROSS-REFERENCE TO RELATED APPLICATIONS

This application is a continuation of U.S. patent application Ser. No. 14/632,983, entitled "IMAGE MANIPULATION FOR ELECTRONIC DISPLAY" filed Feb. 26, 2015, which is hereby incorporated by reference in its entirety for all purposes.

BACKGROUND

Users are increasingly utilizing electronic devices to research, locate, and obtain various types of information. For example, users may utilize a search engine to locate information about various items, such as items offered through an electronic marketplace. While traditional search involved reviewing text results, searches involving items with a visual aspect may present image-based, or at least image inclusive, search results. If comparing items such as dresses, for example, such an approach enables a user to compare images of different dresses to determine which dresses are most visually appealing or otherwise of interest to the user. Such determinations can be difficult, however, as there typically is not precise format for the ways in which these items are presented in images. For example, some of the images might show only a portion of a dress while other images might show the entire person wearing the dress surrounded by a lot of background, which can make the relative sizes appear very different. Further, the small percentage of the image including the dress in some of the images can make it difficult to determine various details or features of the dresses.

BRIEF DESCRIPTION OF THE DRAWINGS

Various embodiments in accordance with the present disclosure will be described with reference to the drawings, in which:

FIGS. 2A, 2B, 2C, and 2D illustrate stages of a process for reducing the amount of background in an image that can be utilized in accordance with various embodiments.

DETAILED DESCRIPTION

Systems and methods in accordance with various embodiments of the present disclosure may overcome one or more of the aforementioned and other deficiencies experienced in conventional approaches to providing images for consumption (e.g., display, print, or projection). In particular, various embodiments enable an image to be cropped such that an object of interest represented in the image occupies a central and majority region of the image. Further, the background can be modified in order to help distinguish the image from other images that might be displayed adjacent the image. In some embodiments, the background is first cropped by starting at the edges and/or corners of the image and moving towards the center of the image until an edge or contour of an object is detected. From such an image, which might include a representation of a person wearing a dress, the location of a head of a person in the image can be determined, which can be used to crop the top of the image to a specific location, such as the mid-point of the person's head. By analyzing regions of skin tone of the lower portion of the image, a location of the person's legs can be determined, which can be used to crop to a location such as just below the hem line of the dress. Finally, an aspect ratio and/or size can be adjusted in order to make the image similar to other images that are likely to be displayed with the manipulated image. Such an approach enables the objects to be represented by a majority of the area of the images, while making it easier to compare objects across images. Such an approach also enables the concurrent display of a large number of images by increasing image density, minimizing background or white space, and minimizing distractions from the primary objects represented in the images.

Various other functions and advantages are described and suggested below as may be provided in accordance with the various embodiments.

Figure 1A:
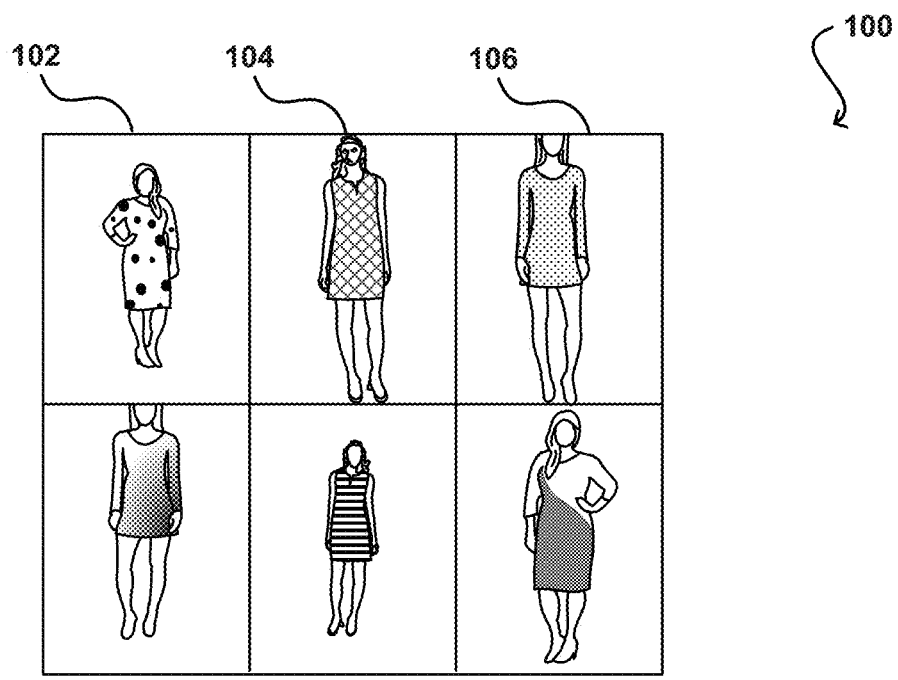
FIGS. 1A and 1B illustrate examples of dress images that can be presented to a user in accordance with various embodiments.
Figure 1B:
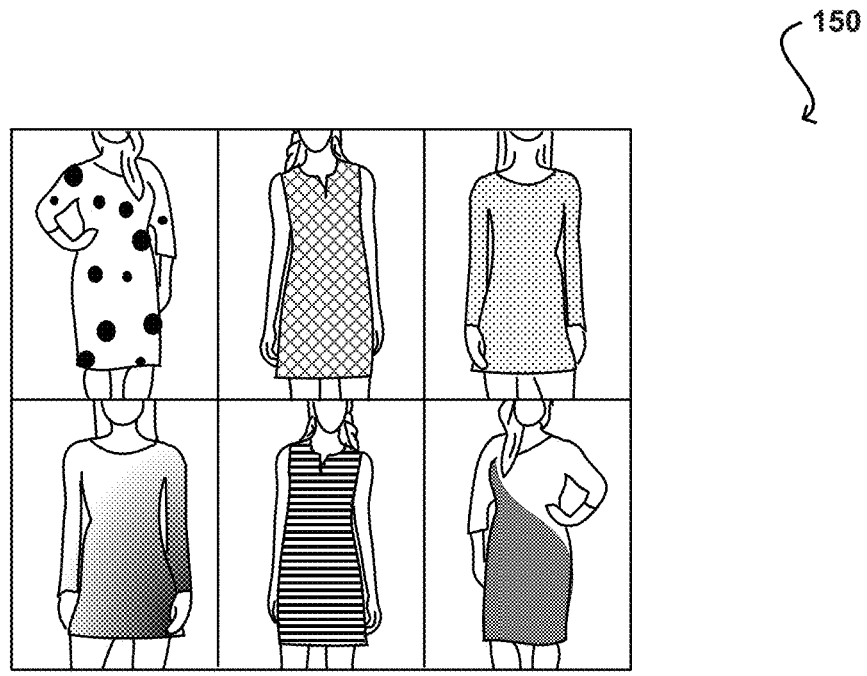

FIG. 1A illustrates an example set of images 100 that might be displayed to a user searching or navigating content relating to dresses for sale. Although dresses are used as an example, it should be understood that various other types of items or object, apparel related or not, can benefit from aspects of the various embodiments as should be apparent in light of the teachings and suggestions contained herein. As illustrated, the portion and region of the images that includes the representations of the dresses varies significantly. For example, in one image 102 the entire person wearing the dress is visible, surrounded by a region of background. The result is that the dress occupies less than a quarter of the image, and fine detail might be unable to be resolved from the image. In other image 104 of the set, the entire person is again visible, but with less background, which improves the percentage of the image that represents the dress. In yet another image 106, only a portion of the head of the user is visible. The other images show other variations in size and location of the dresses. As can be seen from the figure, it can be difficult to accurately compare the dresses due to the differences in the way the dresses are represented in the images. If, however, the dresses were able to be represented in a similar way, such as is illustrated in the set of images 150 of FIG. 1B, it would be easier for a potential customer to view fine details and compare the features of the dresses across images. As illustrated in FIG. 1B, each image is cropped at similar locations of the wearers and has a similar amount of area of the image representing the respective dress, such that the results are more uniform and actual differences among the dresses are easier to discern.

While in some environments it would be possible to have the photos taken and/or processed to be similar when provided, in other embodiments the images might come from multiple sources without a defined standard, which thus can result in variations similar to those illustrated in FIG. 1A.

Systems and methods in accordance with various embodiments address these and other concerns with existing approaches by providing automated processes for cropping or otherwise manipulating images of objects in order to better represent the object in the image and make the representations of the objects in the images more consistent. Such a process can be implemented before providing the images from a source, after receiving the images from one or more sources, before displaying the images, or at other appropriate times.

FIGS. 2A-2D illustrate a first portion of one such process that can be utilized in accordance with various embodiments. It should be understood that "first" as used for these portions is used merely for description, as the portions can be performed in alternate orders, or in parallel, within the scope of the various embodiments. In this example, an image 200 is obtained that includes an object 202 of interest, in this case a dress being worn by a person. It should be understood that in some images a person might not be present, or only a portion of a person might be represented, among other such options. In the example situation 210 of FIG. 2B, a cropping process begins by starting at the corners and/or edges of the image and moving each side of a rectangle 212 inward until an edge or portion of a contour of an object is detected. It should be understood that a rectangle is used here for speed and simplicity because the image of interest is rectangular, but that other shapes can be used as well, such as squares, circles, and irregular shapes or contours. In some instances the background color will be known such that the process can move inward until a region with a color other than the background is determined. In other embodiments, the background color may need to be determined or background objects in the image removed using any appropriate process known or used for such purposes in other image-related processes.

After each edge has stopped at an edge or contour of an object, a rectangularly bound region 222 of the image will be determined that will include the object of interest, as illustrated in the example situation of FIG. 2C. The image in some embodiments can then be cropped to this region, such that the background pixels previously located outside this region in the image are removed from the image file. In some embodiments, the region might be taken, as illustrated in the example situation of FIG. 2D, and expanded in one or more directions in order to obtain an image having a desired aspect ratio while keeping the region substantially centered in the image. In this example, since the width of the image is less than the height by more than the aspect ratio, the height of the image can be maintained while adding columns of pixels of the background color on either side until the desired aspect ratio is reached.

In at least some embodiments, a different approach can be taken to attempt to determine the region corresponding to the object versus the background region. For example, an attempt can be made to locate and/or grow connected regions of background color (or ranges of background color) from the corners or sides of the image towards the center of the image, to the extent possible. A connected component analysis, for example, can be utilized to attempt to connect the entire background region of the image, with the remaining region(s) being considered the object(s) of interest. In FIG. 2D, an outline or mask region 232 can be determined that then corresponds to the foreground (or background) portion of the image. This can be used to crop the image based on the location of the object, or can be used to expand the object to the appropriate aspect ratio, as discussed elsewhere herein.

If the image includes multiple objects, such as a second object as illustrated in the example of FIG. 2D, the connected components analysis can still connect the background regions, which can result in determining a second object region 234 in the image. Various approaches can then either consider these objects together or as separate objects for purposes of cropping or image match. For images with multiple such object regions, one or more rules or policies could be utilized that indicate to select only the top region, most central region, largest region, etc.

Figure 3A:
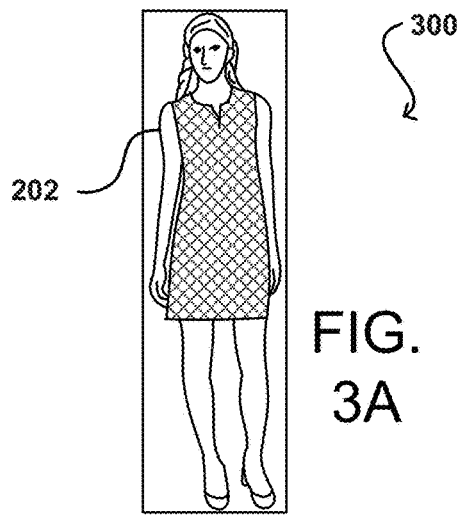
FIGS. 3A, 3B, and 3C illustrate stages of a process for cropping an image based on the location of the representation of the wearer's head that can be utilized in accordance with various embodiments.
Figure 3B:
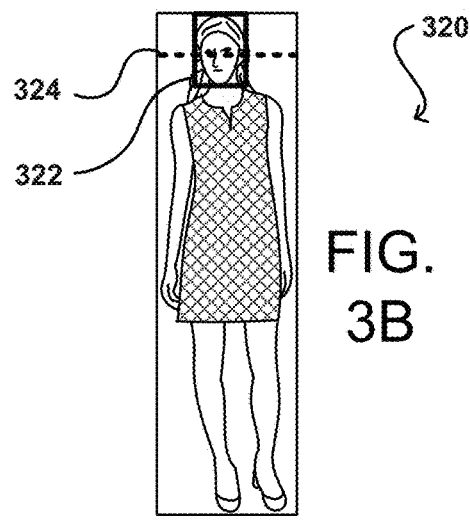
Figure 3C:
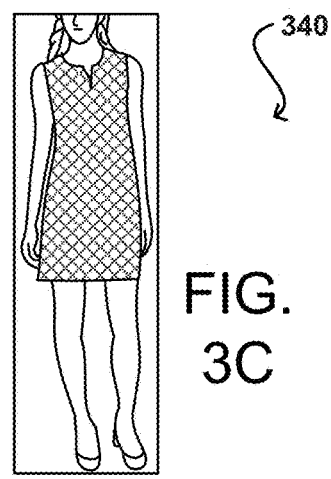

In at least some embodiments, a next portion of the process involves cropping the image based at least in part upon a location of a face of the wearer in the image. As illustrated in the example situation 300 of FIG. 3A, the input can be the cropped image from FIG. 2D that has minimal background, although other versions of the image can be utilized as well within the scope of the various embodiments. From such an image, a face or head recognition process (i.e., a process using a Viola-Jones or deformable parts model (DPM)-based face recognition algorithm) can be used to attempt to locate a face or head in the image, at least in the upper portion (e.g., top half or quarter) of the image. As illustrated in the example situation 320 of FIG. 3B, a location or bounded region 322 identifying the location of such a face can be determined using an appropriate location algorithm as discussed elsewhere herein. From this region, an appropriate location for cropping can be determined. In this example, the location is the midpoint of the head or face region in the up/down direction (in the figure). Such a point can be used to determine the new edge location 324 of the image, which passes through that point and parallel to the upper edge of the image (in the figure). It should be understood that terms such as "up" and "down" are used for purposes of explanation and that other arrangements or directions can be used as well within the scope of the various embodiments as appropriate. Using this edge location, the image can be cropped to remove the portion above that location, as illustrated in the example situation 340 of FIG. 3C. It should be understood, however, that processes other than traditional "cropping" can be used as well within the scope of the various embodiments. For example, pixels in the "cropped" or "cropped out" regions might have their values stored as metadata in the image, or set to an invisible or transparent setting, among other such options, such that the object appears to be cropped but the information is still in the image such that the original image can be recreated from the manipulated or "cropped" image if desired.

Figure 4A:
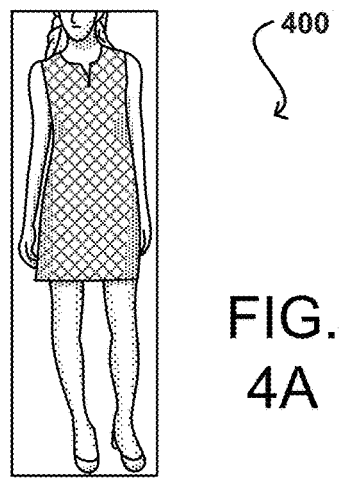
FIGS. 4A, 4B, and 4C illustrate an example process for determining a skin region mask that can be utilized in accordance with various embodiments.
Figure 4B:
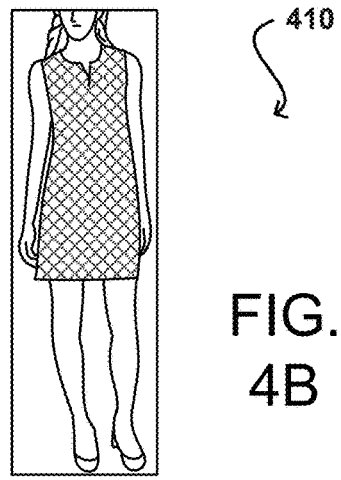
Figure 4C:
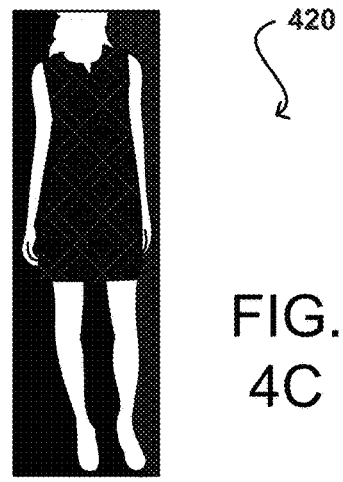

In this example, the cropped image can be used as input to the next portion of the process. In the example situation 400 of FIG. 4A, it can be seen that the cropped image is provided that will likely be a full color (e.g., 24 bit) image, or other such image with a conventional color depth. In order to locate the leg regions without utilizing a complex image recognition process, approaches in accordance with various embodiments can attempt to locate regions of skin color or skin tone that are positioned in a way that would be expected for legs in the image. The skin colors can have ranges of values that can depend at least in part upon the color space, color depth, etc. In order to improve accuracy, in at least some embodiments a version of the cropped image is produced, as illustrated in the example situation 410 of FIG. 4B, which is quantized, or has a reduced color depth. Reducing the color depth to, say, 256 bit color, can cause the skin regions to have less color variation and thus be more likely detected as contiguous regions of skin color. From the quantized image, the color of each pixel in the image can be analyzed to determine whether each pixel is, or is not, colored with a color that is within the range of skin tones. For pixels in that range, those pixels can be assigned a first value, such as 0. For pixels with colors outside the skin color range, those pixels can be assigned a second value, such as 1. The result will then be a mask image, such as is illustrated in the example situation 420 of FIG. 4C, wherein the regions of skin are identified with respect to the non-skin regions. For example, the leg and arm regions of the image are readily identifiable from the skin mask image.

Figure 5A:
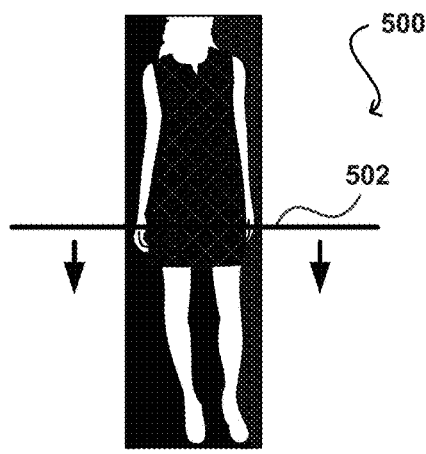
FIGS. 5A, 5B, 5C, 5D, 5E, 5F and 5G illustrate stages of a process for cropping an image based on the location of the wearer's legs that can be utilized in accordance with various embodiments.

Once a skin mask (or similar binary version) is created, that image can be analyzed to attempt to determine the presence of legs in the image, as well of the positions of any such legs. For example, in the situation 500 of FIG. 5A a scan (represented by the scan line 502) can start at, or slightly above, the half way point of the image from top to bottom. This is a reasonable place to start as legs will typically be located in the bottom half of the image, and starting here helps to reduce false positives that might otherwise be detected in the top half of the image. From this point, the scan line can move line by line (or every other line, etc.) towards the bottom of the image and attempt to locate scan lines where transitions between skin and non-skin regions indicate the potential presence of legs. For example, in the situation 510 of FIG. 5B two scan line regions are illustrated where there are regions of skin and non-skin on the scan line. Any scan line that includes one or two areas of skin may be designated as a potential leg position, as the legs could be apart or could be together, where they might appear as a single skin region. A first pair of skin regions is designated by two segments 512, 514 that appear on the same scan line and are separated by a non-skin region. Similarly, a second pair of skin regions is also designated by two segments 516, 518 that appear on the same scan line and are separated by a non-skin region. Based on the scanning of the mask alone, it would be difficult to say with certainty which of these scan line segments correspond to legs and which correspond to arms.

Figure 5B:
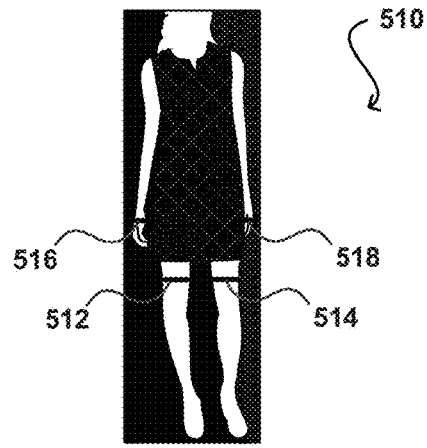
Figure 5C:
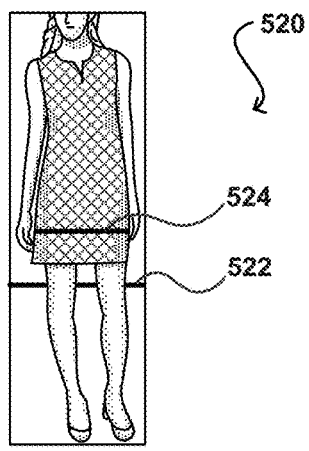
Figure 5D:
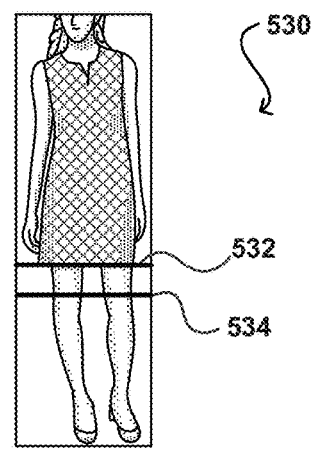

Accordingly, the process also utilizes a version of the image as illustrated in the situation 520 of FIG. 5C, which can be a full color, reduced color, or grayscale image, among other such options. In this example, the image is a grayscale image and areas of background can be distinguished from areas of non-background color. In this case, a set of scan line segments 522 corresponding to the first pair of segments 512, 514 in FIG. 5B shows that only background is located between the skin regions. Such a determination can be made by computing some edge features from a scan line or row of pixels, then processing these features using a classifier algorithm (e.g., hand-trained classifier, trained decision tree, etc.) to determine whether the row contains a dress and hands, a part of clothing, a pair of legs, etc. Based on at least this information, it can be determined from the example that the segments likely correspond to legs. A second scan line segment 524 corresponding to the second pair of scan line segments 516, 518 indicates that, based on the color value of the pixels along the scan line between the skin region, that the area between the skin regions is not background, which indicates that these regions are likely not leg regions, as a dress that stops at the knees, for example, would not have anything (typically) between the legs of the wearer below the knee. Further, the skin regions may be determined to be too thin, too far apart, or otherwise have aspects or dimensions that are indicative of not corresponding to legs in the image. By performing such a process down some, most, or all of the lower half of the image, for example, it can be determined that the visible portion of the legs starts at a particular scan line 532 as illustrated in the situation 530 of FIG. 5D. This may not be a precise determination due to the shape and deformability of the dress or skirt, but such precision may not be necessary for at least some embodiments. Using the position of the start of the legs, a second image edge position 534 can be determined that is between the position and the bottom of the image. This could be located a number of pixels, percentage of pixels, or other fraction between the leg start position 532 and the bottom of the image. Once located, the image can be cropped to yield an image as illustrated in the situation 540 of FIG. 5E.

If a connected components-based approach was used as discussed elsewhere herein, the determination of background pixels between the leg regions can improve the confidence of the determination. Once the image is cropped at the top and/or bottom, columns of pixels of background color can be added to the edges of the image in order to obtain the desired aspect ratio, as previously discussed, and as illustrated in the example situation 560 of FIG. 5G. The pixels can be added based on the object boundary box, the cropped image, or the remaining portion of the foreground mask or contour 542 from the connected components analysis, if available.

Figure 6:
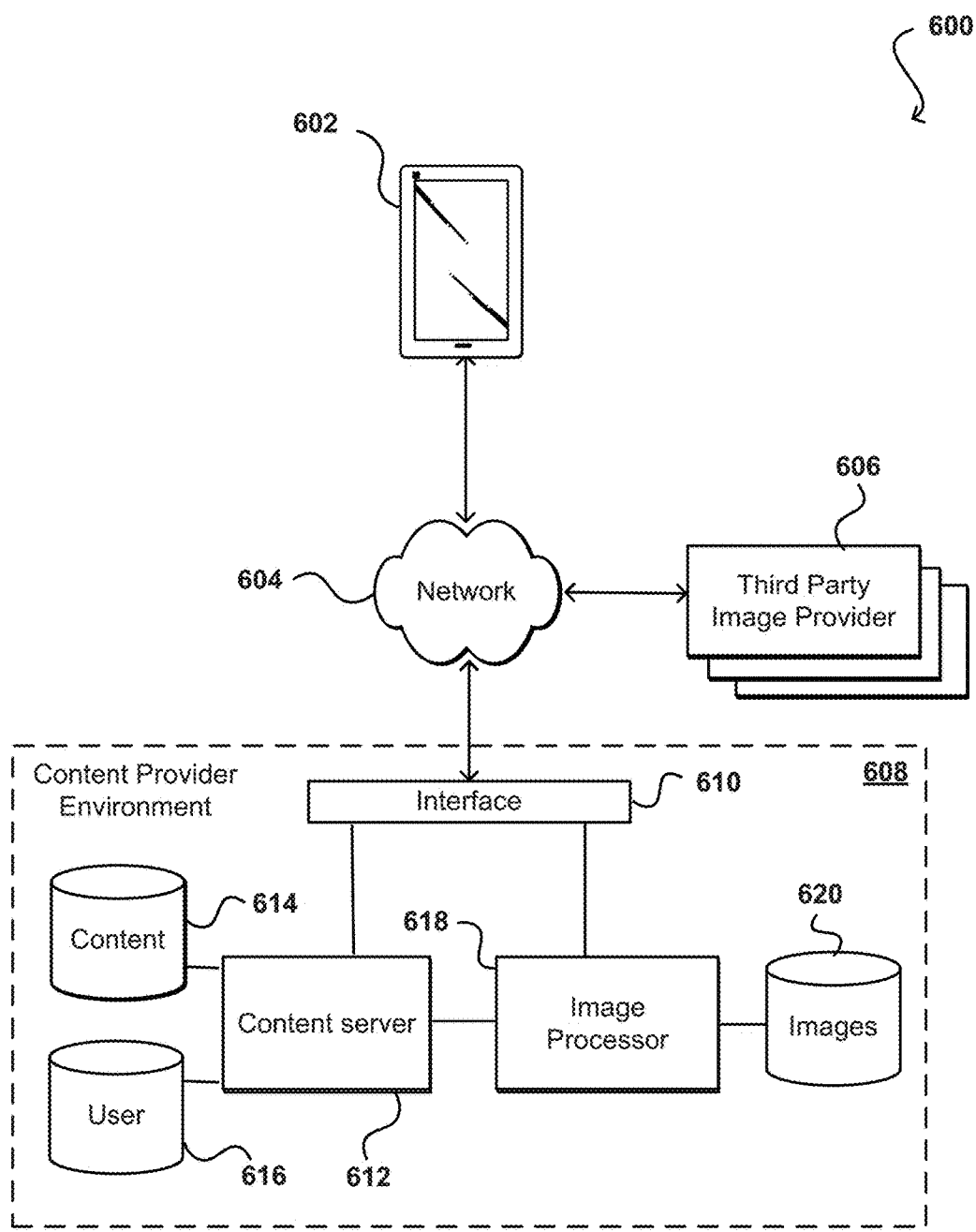
FIG. 6 illustrates an example system that can be used to manipulate images in accordance with various embodiments.

FIG. 6 illustrates an example environment 600 that can be used to implement aspects in accordance with various embodiments. In FIG. 6, a client computing device 602 can submit a request for content across at least one network 604 to be received by a content provider environment 608. The network(s) can include any appropriate network, such as the Internet, a local area network (LAN), a cellular network, an Ethernet, or other such wired and/or wireless network. The content provider environment 608 can include any appropriate resources for providing content from a resource provider, as may include various servers, data stores, and other such components known or used for providing content from across a network (or from the "cloud").

In this example, a call received to the resource provider environment 608 can be received by an interface layer 610 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content servers 612, which can obtain the content from a content data store 614 or other such repository to be sent back across the network(s) to the computing device. In some embodiments, information for the request might also be compared against user data in a user data store 616 or other such location do determine, for example, whether the user has access rights to that content. In one example, the content can include a plurality of images to be displayed as part of a set of search results, although various other types of content and uses for images can be utilized as well within the scope of the various embodiments.

In some cases, a request received to the content provider environment 608 might be from another entity, such as a third party image provider 606. As discussed previously, such providers may provide images to be displayed to users along with the served content. The interface layer can determine the type of request and cause information to be forwarded to an image processor 618 or other such component, which in some embodiments can cause the images to be stored to an image data store 620 at least temporarily. Since it may be desirable to manipulate at least some of the images before being presented for display, as discussed herein, the image processor can process at least some of the images before causing those images to be stored in the content repository 614, for example, to be presented for display to a user or otherwise utilized. Thus, at least one image processor 618 or other such system or component can perform any or all of the image processing approaches discussed herein, in order to manipulate appropriate images before those images are able to be provided to a client device 602, or other such destination, by the content server 612. In some embodiments, the third party image providers 606 might instead (or additionally) perform the image manipulation, while in other embodiments the image manipulation might be provided as a service from an entity other than the content provider, among other such options.

Figure 7:
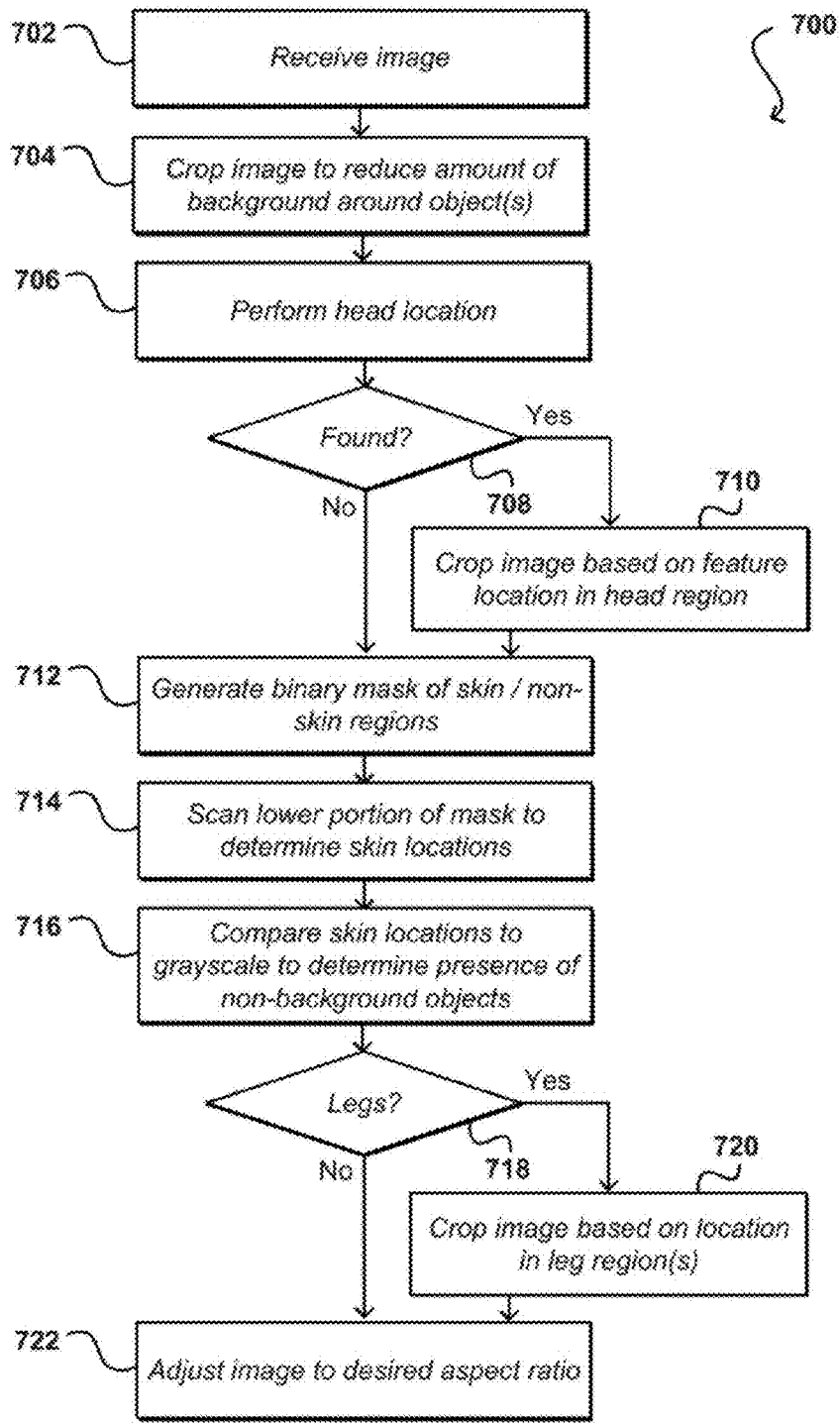
FIG. 7 illustrates an example process for cropping an image that can be utilized in accordance with various embodiments.

FIG. 7 illustrates an example process 700 that can be utilized in such an environment in accordance with various embodiments. It should be understood that, for this and other processes discussed herein, there can be additional, fewer, or alternative steps, performed in similar or alternative steps, or in parallel, within the scope of the various embodiments unless otherwise stated. In this example, an image is received 702, such as from a third party image provider. Before making the image available to users, for example, at least some processing can be performed as discussed herein. In this example, the process includes cropping 704 the image to reduce the amount of background in the image and cause the object(s) of interest in the image to be more prominent, or occupy a larger percentage of the area of the image. As mentioned, this can include starting from the edges of the image and moving inward until an edge, contour, or other portion of an object are detected. Other approaches can be used as well, such as starting from the center of the image and moving outward until hitting background pixels or determining a contour of the object of interest in the image and then generating a bounding box around that contour, among other such options.

In addition, the example process includes the performing 706 of a head or face location process, in order to determine a region in which at least a portion of a head or face is represented in the image. This can include using a face or object detector, such as a deformable parts model (DPM) face detector algorithm, to locate a representation of a face in the image, particularly in the upper portion (e.g., upper 25% or upper 33%) of the image. The algorithm can return any of a number of types of results, such as eye or feature locations, bounding box coordinates, and the like. If it is determined 708 that no face or head can be located in the upper portion of the image, the process can continue without action. If a face or head region can be found, the image can be cropped 710 based at least in part upon the determined location of the face or head region. For example, a mid-point (i.e., centroid) of the region or bounding box can be used as an upper edge location at which to crop the image. In some embodiments specific features can be used to determine the crop position, such as the nose, mouth, or eye positions. Various other locations within (or in relation to) the face or head region can be used as well. In some embodiments, the crop position can be set as the bottom of the face or head region, in order to remove the representation of the face or head from the image. In other embodiments, the amount of the head region that is cropped may depend at least in part upon the confidence of the face detection algorithm in the presence and location of a face representation in the image.

The process also can attempt to crop the bottom of the image just below the bottom of the dress or skirt, in order to minimize the amount of non-item portion of the person represented in the image. In this example, a binary mask of skin/non-skin pixels is generated 712. This can include reducing the color depth of the image, in order to make the skin regions more contiguous in the mask image, and then comparing the color of each pixel in the image to a range of skin tone color. The range of skin tone colors can vary, not only to account for variations in skin tone but also to account for variations due to shadows, lighting, etc. The range should be broad enough to encompass most skin tone colors while being narrow enough to reduce the number of false positives. In some embodiments, each pixel having a color within the skin tone range can be set to white and each pixel having a color outside the skin tone range can be set to black in order to generate the binary mask image. Using the mask image, a scan can be performed 714 of the lower portion (e.g., lower half or slightly more than the lower half) of the image in order to attempt to determine the skin locations in that portion of the image. As mentioned, this can include looking for rows of pixels in the mask where there are one to two regions of skin, and in some embodiments where these regions are of a minimum size and/or spatial relation to each other. For columns where such skin regions are located, the locations can be compared 716 against a grayscale (or color) version of the image, for example, in order to determine whether there is background or non-background between (or adjacent) the skin regions. If there are two skin regions visible that are separated by just background, or with no portion of another object in-between, it can be determined 718 that these skin regions likely correspond to legs. Similarly, if there is a single skin portion but only background in other portions of the row of pixels, it can be determined that the region likely correspond to legs that are shown together in the image. If such leg determinations are made, the image can be cropped 720 using a determined location in the leg regions, such as just below the top of the leg regions, 10% or 20% of the way down the leg region, etc. If no leg regions are determined, the bottom of the image may be left at the position resulting from other portions of the process. In this example, the image can also be adjusted 722 to the desired aspect ratio. Other adjustments can be made as well, such as adjustments to the size or resolution, color depth, brightness and contrast levels, etc. Further, the cropping may delete the information from the "cropped out" pixels or maintain that information as discussed elsewhere herein.

In some embodiments various aspects of the skin regions can be used to attempt to determine the leg regions, either alone or in combination with the scanning approach discussed above. For example, dimensions such as the maximum width, minimum width, number of background pixels along a row, number of non-background pixels along a row, and the width of non-background regions, among others, can be used to determine the likelihood that a region of skin tone corresponds to a representation of a leg. Values for some or all of these dimensions can be processed using an appropriate classifier algorithm that can be trained to provide ground truth results as to leg regions versus non-leg regions. A trained classifier then can generalize to a set of general rules that, in at least some embodiments, would be similar to the rules used with the scanning process discussed above.

Figure 5E:
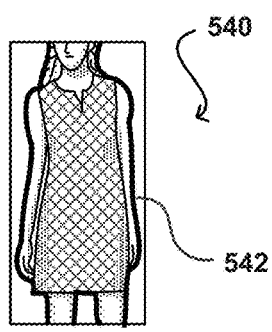
Figure 5F:
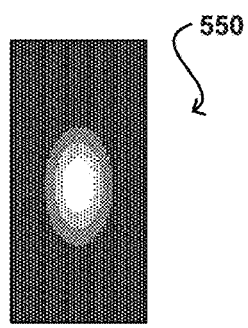
Figure 8:
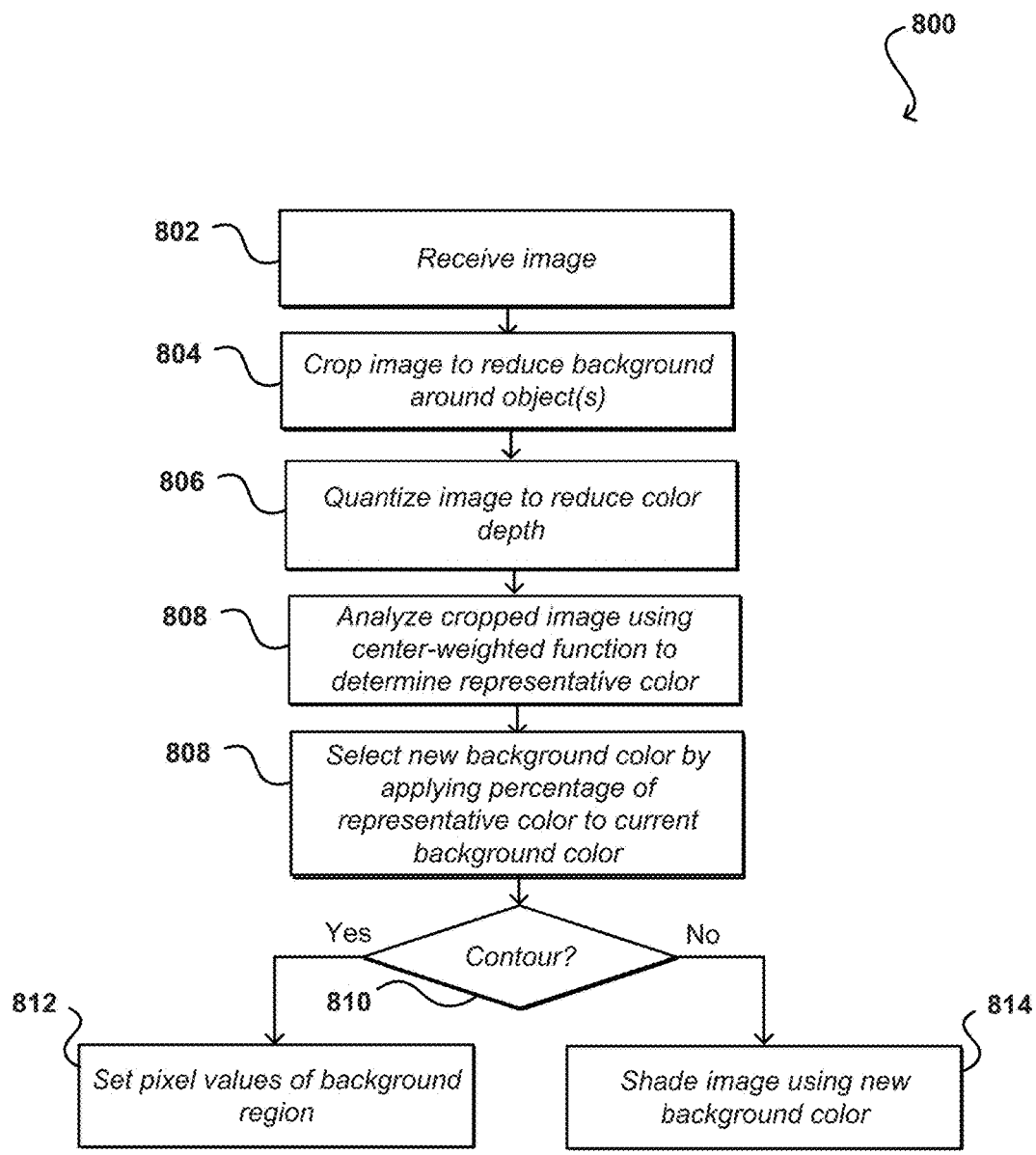
FIG. 8 illustrates an example process for modifying the appearance of the background in an image that can be utilized in accordance with various embodiments.

In addition, in some embodiments it can be desirable to shade the image, or at least alter the background color of an image, in order to enable a user to more easily distinguish separate images. Referring back to FIG. 5G, it can be seen that the background portion 552 of the image is shaded or otherwise has a color applied to the relevant pixels such that the background will vary at least slightly from other images. Such a process can utilize color information from the image itself, in order to select a color that complements the image and does not contrast in an unappealing way. Further, the change in color may be subtle to enable distinction while not distracting from the image. FIG. 8 illustrates one example process 800 for adjusting the color of at least the background of the image that can be utilized in accordance with various embodiments. In this example, an image is received 802 that is to be made available to users. The image may have already gone through a cropping process as described with respect to FIG. 7, or this process may be part of such a cropping process, among other such options. In this example, the image is cropped 804 (assuming region left or present to crop) to reduce the amount of background around the object(s) of interest in the image. It should be understood, however, that color adjustment can be performed without cropping in other embodiments. The cropped image can then be analyzed 806 using a center-weighted function to determine a representative color of the object. FIG. 5F illustrates an example center-weighted function 550 showing relative weights that can be applied to pixels of the cropped region in various embodiments. If a connected components approach was utilized that indicates the object region, such a function can be applied to the object region instead of the entire (or cropped) image. While other functions can be utilized as well, a center-weighted function can be desirable as the object of interest will likely have a portion located at or near the center of the image, particularly after cropping, but since the shape can vary drastically it can be beneficial to weight pixels less as approaching the edge of the image. In this way, a color that is present for a substantial region near the center will likely be selected. Blending is not performed in at least some embodiments, as blending of colors can result in a wide variety of results that may clash with the object itself. In one example of weighting, each pixel at or near the center might count as 100% of a pixel count, while pixels further out toward the edge might only count as 10% of a pixel count or less. The total pixel count, average count, etc., of each represented color can then be analyzed to select the color with the highest associated pixel count. In some embodiments colors or shades such as black and white might be eliminated from consideration for aesthetic or other such purposes.

Figure 5G:
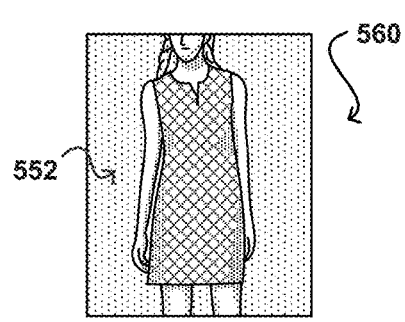

A new background color for the image can then be selected 808 by applying a percentage of the representative color to the current background color. For example, if the color selected from the object is royal blue and the background is white, the new background color might be selected that is 90% white and 10% blue. In other embodiments, the royal blue might be layered over the white, but with a 90% transparency. Various other approaches can be utilized as well, which would result in a new background color that is white with a hint of royal blue. If a foreground contour or object mask is not available 810, the new background color can be applied 814 to the entire image, with the pixels can be shaded with the new color to cause the background color to change while only causing minor changes in the color of the object. In some embodiments the entire image is shaded with the representative color with a certain amount of transparency, instead of generating the new background color first. In still other embodiments, particularly where there is a contour 542 from the connected components analysis as illustrated in FIG. 5E, the region 552 of the image having the background color can be determined, and the corresponding pixel values set 812 to have the new background color as illustrated in FIG. 5G. Various other approaches can be used as well within the scope of the various embodiments.

Figure 9:
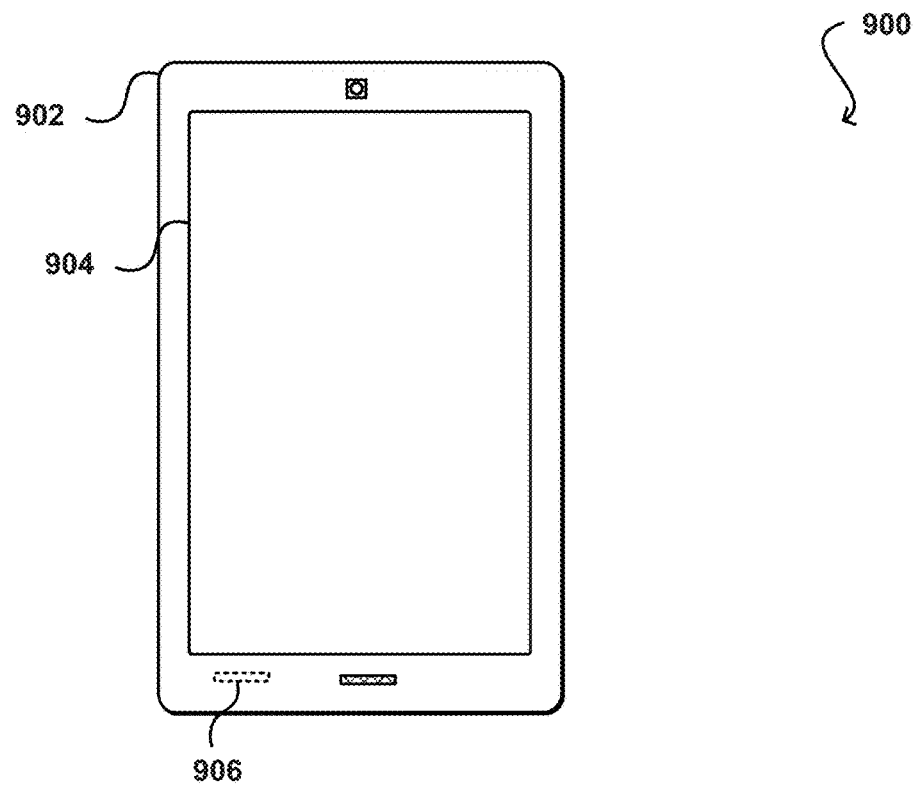
FIG. 9 illustrates an example computing device that can be utilized in accordance with various embodiments.

FIG. 9 illustrates an example computing device 900 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

Figure 10:
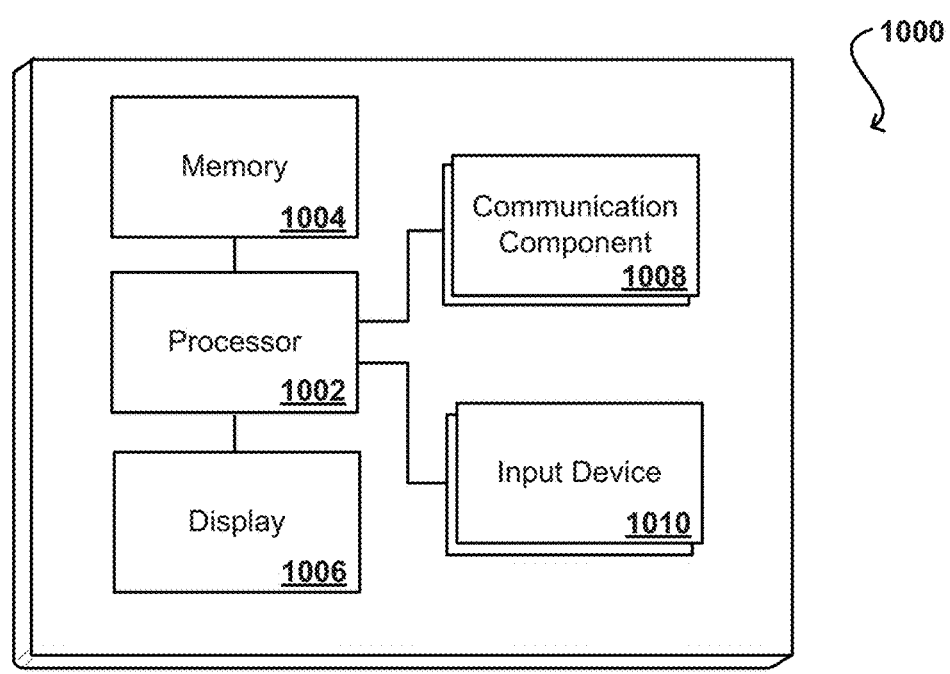
FIG. 10 illustrates an example configuration of components of a computing device, such as the device illustrated in FIG. 9.

In this example, the computing device 900 has a display screen 904 and an outer casing 902. The display screen under normal operation will display information to a user (or viewer) facing the display screen (e.g., on the same side of the computing device as the display screen). As discussed herein, the device can include one or more communication components 906, such as may include a cellular communications subsystem, Wi-Fi communications subsystem, BLUETOOTH® communication subsystem, and the like. FIG. 10 illustrates a set of basic components of a computing device 1000 such as the device 900 described with respect to FIG. 9. In this example, the device includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the at least one processor 1002, the same or separate storage can be used for images or data, a removable memory can be available for sharing information with other devices, and any number of communication approaches can be available for sharing with other devices. The device typically will include at least one type of display element 1006, such as a touch screen, electronic ink (e-ink), organic light emitting diode (OLED) or liquid crystal display (LCD), although devices such as portable media players might convey information via other means, such as through audio speakers. The device can include at least one communication component 1008, as may enabled wired and/or wireless communication of voice and/or data signals, for example, over a network such as the Internet, a cellular network, a Wi-Fi network, BLUETOOTH®, and the like. The device can include at least one additional input device 1010 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 11:
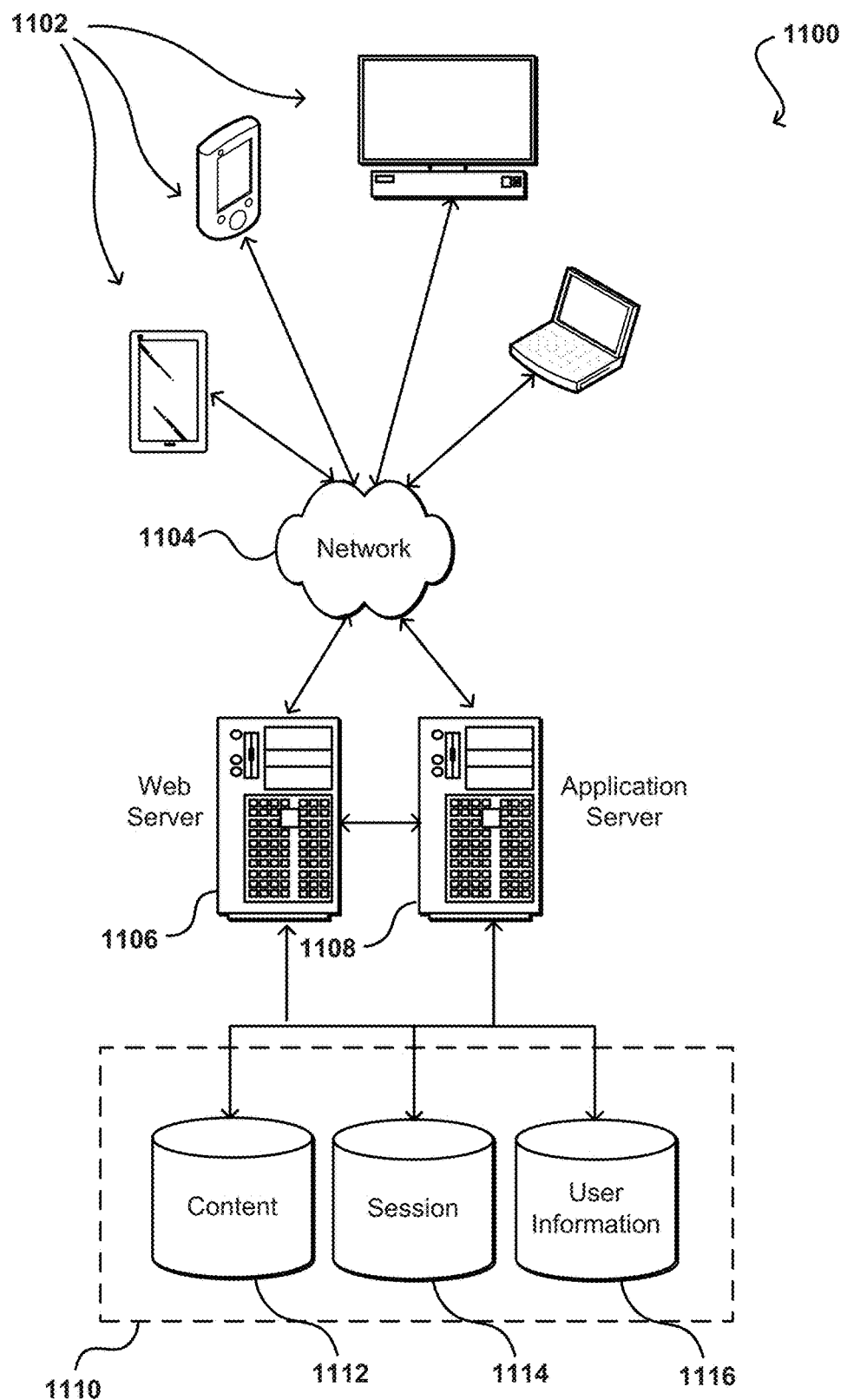
FIG. 11 illustrates an example environment in which aspects of the various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor; and
   memory storing instructions that, when executed by the at least one processor, cause the system to:
   receive a first image that includes a representation of an object;
   generate a second image having a lower color depth with respect to the first image;
   analyze the second image to locate regions of pixels within a boundary associated with skin tone color values;
   generate a binary skin mask indicating the regions of pixels;
   scan, from at least a middle row of the binary skin mask, rows of pixels to locate features corresponding to skin feature locations;
   compare the features to corresponding positions in a grayscale version of the first image to determine whether pixels of non-background color are located in corresponding rows of the second image; and
   determine a location of a representation of a bodily feature based at least in part by locating rows having skin feature regions of sufficient width, with background color pixels outside the skin feature regions in respective rows of pixels.

2. The system of claim 1, wherein the instructions when executed to generate the second image further enable the system to:
   crop the first image based at least in part on the boundary to generate the second image that includes the representation of the object.

3. The system of claim 1, wherein the instructions when executed further enable the system to:
   determine a background region, the background region associated with a background color;
   analyze the first image to determine a region associated with a color different from the background color; and
   determine the boundary based at least in part on the region.

4. The system of claim 1, wherein the instructions when executed to generate the second image further enable the system to:
   add columns of pixels of a background color to the second image in order to cause the second image to have a specified aspect ratio.

5. The system of claim 1, wherein the instructions when executed further cause the system to:
   determine a feature associated with the object represented in the first image;

use a connected components algorithm to determine a region of background color; and
determine the boundary around the representation of the object based at least in part on the region of background color.

6. The system of claim 1, wherein the instructions when executed further cause the system to:
process, from sides of the first image towards a center of the first image, pixel values of pixels of the first image until a bounding box is determined that satisfies a threshold bounding box size to encompass the representation of the object in the first image.

7. The system of claim 1, wherein the bodily feature includes a leg portion of a person, and wherein the instructions when executed further cause the system to:
use a face recognition algorithm on the second image to recognize one of a face or a head in the second image;
determine a reference point for the one of the face or the head; and
crop the second image, from the reference point, to remove a portion of one of the face or the head from the second image.

8. The system of claim 7, wherein the instructions when executed further cause the system to:
crop at least a portion of the representation of the bodily feature to remove the portion from the second image.

9. A computer-implemented method, comprising:
receiving a first image that includes a representation of an object;
generating a second image having a lower color depth with respect to the first image;
analyzing the second image to locate regions of pixels within a boundary associated with skin tone color values;
generating a binary skin mask indicating the regions of pixels;
scanning, from at least a middle row of the binary skin mask, rows of pixels to locate features corresponding to skin feature locations;
comparing the features to corresponding positions in a grayscale version of the first image to determine whether pixels of non-background color are located in corresponding rows of the second image; and
determining a location of a representation of a bodily feature based at least in part by locating rows having skin feature regions of sufficient width, with background color pixels outside the skin feature regions in respective rows of pixels.

10. The computer-implemented method of claim 9, further comprising:
determining a background region, the background region associated with a background color;
analyzing the first image to determine a region associated with a color different from the background color; and
determining the boundary based at least in part on the region.

11. The computer-implemented method of claim 9, further comprising:
determining a feature associated with the object represented in the first image;
using a connected components algorithm to determine a region of background color; and
determining the boundary around the representation of the object based at least in part on the region of background color.

12. The computer-implemented method of claim 9, further comprising:
processing, from sides of the first image towards a center of the first image, pixel values of pixels of the first image until a bounding box is determined that satisfies a threshold bounding box size to encompass the representation of the object in the first image.

13. The computer-implemented method of claim 9, wherein the bodily feature includes a leg portion of a person, the method further comprising:
using a face recognition algorithm on the second image to recognize one of a face or a head in the second image;
determining a reference point for the one of the face or the head; and
cropping the second image, from the reference point, to remove a portion of one of the face or the head from the second image.

14. The computer-implemented method of claim 13, further comprising:
cropping at least a portion of the representation of the bodily feature to remove the portion from the second image.

15. A non-transitory computer readable storage medium storing instructions that, when executed by at least one processor of a computing system, causes the computing system to:
receive a first image that includes a representation of an object;
generate a second image having a lower color depth with respect to the first image;
analyze the second image to locate regions of pixels within a boundary associated with skin tone color values;
generate a binary skin mask indicating the regions of pixels;
scan, from at least a middle row of the binary skin mask, rows of pixels to locate features corresponding to skin feature locations;
compare the features to corresponding positions in a grayscale version of the first image to determine whether pixels of non-background color are located in corresponding rows of the second image; and
determine a location of a representation of a bodily feature based at least in part by locating rows having skin feature regions of sufficient width, with background color pixels outside the skin feature regions in respective rows of pixels.

16. The non-transitory computer readable storage medium of claim 15, wherein the instructions, when executed by the at least one processor, further causes the computing system to:
crop the first image based at least in part on the boundary to generate the second image that includes the representation of the object.

17. The non-transitory computer readable storage medium of claim 15, wherein the instructions, when executed by the at least one processor, further causes the computing system to:
determine a background region, the background region associated with a background color;
analyze the first image to determine a region associated with a color different from the background color; and
determine the boundary based at least in part on the region.

18. The non-transitory computer readable storage medium of claim 15, wherein the instructions, when executed by the at least one processor, further causes the computing system to:

determine a feature associated with the object represented in the first image;

use a connected components algorithm to determine a region of background color; and determine the boundary around the representation of the object based at least in part on the region of background color.

19. The non-transitory computer readable storage medium of claim 15, wherein the bodily feature includes a leg portion of a person, and wherein the instructions, when executed by the at least one processor, further causes the computing system to:

use a face recognition algorithm on the second image to recognize one of a face or a head in the second image;

determine a reference point for the one of the face or the head; and crop the second image, from the reference point, to remove a portion of one of the face or the head from the second image.

20. The non-transitory computer readable storage medium of claim 19, wherein the instructions, when executed by the at least one processor, further causes the computing system to:

crop at least a portion of the representation of the bodily feature to remove the portion from the second image.

* * * * *